(12) United States Patent
Bryant et al.

(10) Patent No.: US 10,691,846 B2
(45) Date of Patent: Jun. 23, 2020

(54) CAPILLARY NETWORK SIMULATIONS BASED ON A LOW-DIMENSIONAL REPRESENTATION OF POROUS MEDIA

(71) Applicant: International Business Machines Corporation, Armonk, NY (US)

(72) Inventors: Peter William Bryant, Rio de Janeiro (BR); William Fernando Lopez Candela, Niteroi (BR); Alexandre Ashade Lassance Cunha, Rio de Janeiro (BR); Rodrigo Neumann Barros Ferreira, Rio de Janeiro (BR); Mathias B Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 15/446,410

(22) Filed: Mar. 1, 2017

(65) Prior Publication Data
US 2018/0253514 A1 Sep. 6, 2018

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .................. G06F 17/5009; G06F 2217/16
See application file for complete search history.

(56) References Cited

U.S. PATENT DOCUMENTS

| | | | |
|---|---|---|---|
| 6,008,645 A | 12/1999 | Bowers et al. |
| 7,277,795 B2 | 10/2007 | Boitnott |
| 8,059,877 B2 | 11/2011 | Geiger et al. |
| 8,073,227 B2 | 12/2011 | Gulsun et al. |
| 8,081,802 B2 | 12/2011 | Dvorkin et al. |
| 8,155,377 B2 | 4/2012 | Dvorkin et al. |
| 8,311,788 B2 | 11/2012 | Hurley et al. |
| 8,725,477 B2 | 5/2014 | Zhang et al. |
| 8,908,925 B2 | 12/2014 | Hurley et al. |
| 8,909,508 B2 | 12/2014 | Hurley et al. |

(Continued)

OTHER PUBLICATIONS

Suicmez, V.S. et al., "Pore Network Modeling: A new Technology for SCAL predictions and interpretations," Society of Petroleum Engineers SPE 110961, pp. 1-6 (2007) (Year: 2007).*

(Continued)

*Primary Examiner* — Rehana Perveen
*Assistant Examiner* — Steven W Crabb
(74) *Attorney, Agent, or Firm* — Harrington & Smith

(57) ABSTRACT

A method is provided including receiving data corresponding to a three-dimensional physical representation of a porous rock sample; calculating a low-dimensional representation of a pore network in the porous rock sample based on the three-dimensional physical representation; extracting one or more geometrical parameter from the low-dimension representation; generating a capillary network model of the porous rock sample based at least on the at least one geometrical parameter for simulating fluid flow inside the porous rock sample; and performing at least one simulation of a flow of the fluid through the capillary network model of the porous rock sample with a fluid additive to provide a predicted enhanced fluid recovery efficiency.

20 Claims, 9 Drawing Sheets

(56) References Cited

U.S. PATENT DOCUMENTS

| | | | |
|---|---|---|---|
| 9,134,457 | B2 | 9/2015 | Hurley et al. |
| 2010/0154514 | A1 | 6/2010 | Algive et al. |
| 2012/0221306 | A1 | 8/2012 | Hurley et al. |
| 2013/0308837 | A1 | 11/2013 | Abe |
| 2013/0338976 | A1 | 12/2013 | De Prisco et al. |
| 2014/0019054 | A1 | 1/2014 | De Prisco et al. |
| 2014/0044315 | A1 | 2/2014 | Derzhi et al. |
| 2014/0058676 | A1 | 2/2014 | De Prisco et al. |
| 2015/0262373 | A1* | 9/2015 | Goel .......... G06T 7/60 382/131 |
| 2016/0318256 | A1* | 11/2016 | Alkhatib ......... G06T 17/00 |
| 2017/0258433 | A1* | 9/2017 | Gulsun ......... A61B 6/5217 |

OTHER PUBLICATIONS

Masood, Talha Bin et al., "CHEXVIS: a tool for molecular channel extraction and visualization," BMC Bioinformatics 2015; 16:119, pp. 1-31 (Year: 2015).*

Valvatne, Per H. et al., "Predictive Pore-Scale Network Modeling," SPE 84550 pp. 1-12 (Year: 2033).*

Ana Maria Mendonca (Senior Memeber IEEE) and Aurelio Campilho (Member IEEE), "Segmentation of Retinal Blood Vessels by Combining the Detection of Centerlines and Morphological Reconstruction" IEEE Transactions on Medical Imaging, vol. 25, No. 9, Sep. 2006.

Ming Wan, Zhengrong Liang, Qi Ke, Lichan Hong, Ingmar Bitter, and Arie Kaufman, "Automatic Centerline Extraction for Virtual Colonoscopy" IEEE Transactions on Medical Imaging, vol. 21, No. 12, Dec. 2002.

C. Wayne Niblack, Phillip B. Gibbons, and David W. Capson, "Generating Skeletons and Centerlines from the Distance Transform" CVGIP: Graphical Models and Image Processing vol. 54, No. 5, September, pp. 420-437, 1992.

L. Holzer, D. Wiedenmann, B. Munch, L. Keller, M. Prestat, Ph. Gasser, I. Robertson, B. Grobety, "The Influence of Constrictivity on the Effective Transport Properties of Porous Layers in Electrolysis and Fuel Cells" Journal of Materials Science 48(7): 2934-2952, 2013.

Koroteev et al., "Application of Digital Rock Technology for Chemical EOR Screening", SPE 165258, 2013 Society of Petroleum Engineers, prepared for presentation at SPE Enhanced Oil Recovery Conference held in Kual Lumpur, Malaysia Jul. 2-4, 2013.

Daian et al., "3D Reconstitution of Porous Media from Image Processing Data using a Multicase Percolation System", Journal of Petroleum Science and Engineering, Oct. 16, 2003.

Fernandes et al., "Multiscale Geometrical Reconstruction of Porous Structures", Physical Review E, vol. 54, No. 2, Aug. 1996.

Liang et al., "A Reconstruction Technique for Three-Dimensional Porous Media Using Image Analysis and Fourier Transforms", Journal of Petroleum Science and Engineering, 21 (Jul. 1998) pp. 273-283.

Huang et al, "Proposed Approximation for Contact Angles in Shan-and-Chen-type Multicomponent Multiphase Lattice Boltzmann Models", Physical Review E 76, 2007.

Schmieschek et al., "Contact Angle Determination in Multicomponent Lattice Boltzmann Simulations", Commun. Comput. Phys. vol. 9, No. 5, pp. 1165-1178, May 2011.

Tartakovsky et al., "Modeling of Surface Tension and Contact Angles with Smoothed Particle Hydrodynamics", Physical Review E 72, 026301, 2005.

Das et al., "Equilibrium Shape and Contact Angle of Sessile Drops of Different Volumes—Computation by SPH and its Further Improvement by DI", Chemical Engineering Science, 2010, pp. 4027-4037.

Liu et all, "Modeling of Contact Angles and Wetting Effects with Particle Methods", International Journal of Computational Methods, vol. 9, No. 4 (2011), 637-651.

Henrich et al., "An Adhesive DPD Wall Model for Dynamic Wetting", A Letters Journal Exploring the Frontiers of Physics, Dec. 2007.

Lin et al., "Surface Wettability and Contact Angle Analysis by Dissipative Particle Dynamics", Interaction and Multiscale Mechanics, vol. 5, No. 4 (2012) p. 399-405.

http://www.fei.com/software/avizo-3d-for-digital-rock-and-core-analysis/ Avizo 3D Software for Core Sample and Digital Rock Anaylsis; downloaded Apr. 11, 2016.

https://en.wikipedia.org/wili/Tomography downloaded Apr. 11, 2016.

Rocketh Group, http://www.rockphysics.ethz.ch/ Imperial College Department of Earth Science and Engineering.

Digital Rocks Portal https://www.digitalrocksportal.org/ University of Texas.

* cited by examiner

CAPILLARY NETWORK SIMULATIONS BASED ON A LOW-DIMENSIONAL REPRESENTATION OF POROUS MEDIA

TECHNICAL FIELD

The exemplary embodiments of this invention relate generally to simulation methods, computer programs and apparatus and, more specifically, to computer fluid flow simulations using a simplified geometrical representation of porous network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Fluid-fluid and fluid-solid interactions in digital rock analysis (DRA) can be modeled in order to better predict enhanced oil recovery (EOR) efficiency and to support decision-making in oil recovery operations. One approach to such modeling is Pore Network Modeling and its implementations focus on the connectivity of the pore network. The complex geometry is reduced to a "balls-and-sticks" representation. The geometry, morphology and, most importantly, the surface aspects of it are often neglected, giving rise to cruder models of the fluid flow. Fluid flow properties are obtained using an electrical-analogue often without dynamics, applying simpler heuristics and physical approximations to describe the system.

BRIEF SUMMARY

This section is intended to include examples and is not intended to be limiting.

In an example embodiment, a method is provided including receiving data corresponding to a three-dimensional physical representation of a porous rock sample; calculating a low-dimensional representation of a pore network in the porous rock sample based on the three-dimensional physical representation; extracting one or more geometrical parameter from the low-dimension representation; generating a capillary network model of the porous rock sample based at least on the at least one geometrical parameter for simulating fluid flow inside the porous rock sample; and performing at least one simulation of a flow of the fluid through the capillary network model of the porous rock sample with a fluid additive to provide a predicted enhanced fluid recovery efficiency.

In another example embodiment an apparatus is provided, including at least one processor; and at least one memory including computer program code, the at least one memory and the computer program code configured to, with the at least one processor, cause the apparatus to at least: receive data corresponding to a three-dimensional physical representation of a porous rock sample; calculate a low-dimensional representation of a pore network in the porous rock sample based on the three-dimensional physical representation; extract one or more geometrical parameter from the low-dimension representation; generate a capillary network model of the porous rock sample based at least on the at least one geometrical parameter for simulating fluid flow inside the porous rock sample; and perform at least one simulation of a flow of fluid through the capillary network model of the porous rock sample with a fluid additive to provide a predicted enhanced fluid recovery efficiency.

In another example embodiment, a computer program product for capillary network simulations, the computer program product comprising a computer readable storage medium having program instructions embodied therewith, the program instructions executable by a device to cause the device to: receiving data corresponding to a three-dimensional physical representation of a porous rock sample; calculating a low-dimensional representation of a pore network in the porous rock sample based on the three-dimensional physical representation; extracting one or more geometrical parameter from the low-dimension representation; generating a capillary network model of the porous rock sample based at least on the at least one geometrical parameter for simulating fluid flow inside the porous rock sample; and performing at least one simulation of a flow of fluid through the capillary network model of the porous rock sample with a fluid additive to provide a predicted enhanced fluid recovery efficiency.

BRIEF DESCRIPTION OF THE DRAWINGS

In the attached Drawing Figures:

FIGS. 5A and 5B is a non-limiting example of a capillary network and the corresponding system of equations used to find nodal pressures in accordance with example embodiments;

DETAILED DESCRIPTION

Figure 1:
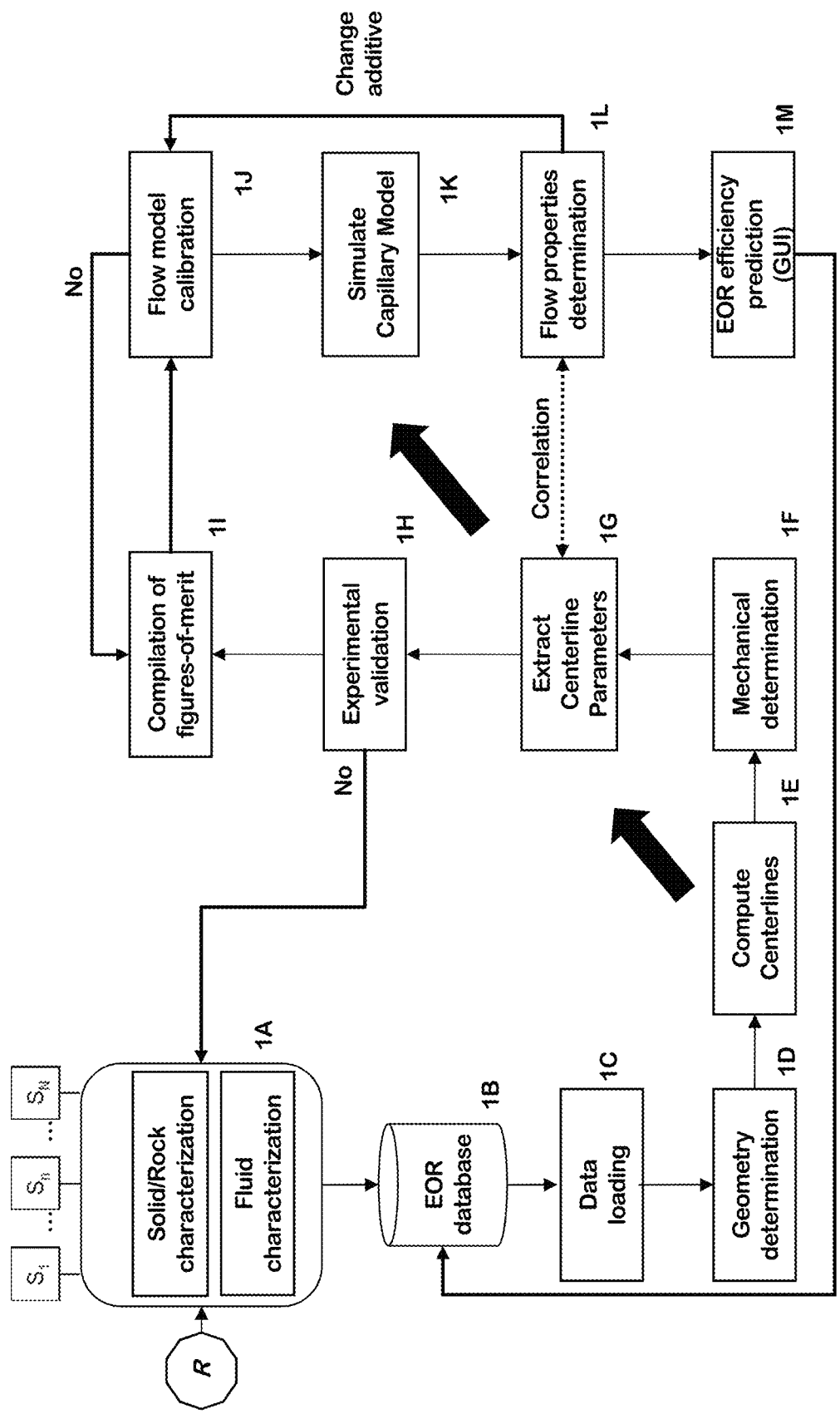
FIG. 1 illustrates a non-limiting example of a simulator and simulation workflow in accordance with example embodiments.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

An alphabetically arranged list of abbreviations and associated definitions that occur in the description of the invention is provided below for the convenience of the reader.

DRA digital rock analysis
EOR enhanced oil recovery
MPS multi-point statistics
MSPS multiscale percolation system As employed herein a voxel can be considered as a 'volume pixel' that is one element of an array of elements of volume.

The exemplary embodiments herein describe techniques for capillary network simulations based on a low-dimensional representation of porous media.

Relevant teachings have addressed the concept of "Pore Network Model" (PNM), which describes a complex porous network in terms of a dichotomist pores-and-throats (or balls-and-sticks) approximation; explored centerline extraction algorithms to obtain a one-dimensional representation of simple, often tubular, geometries of medical interest; described centerline extraction algorithms for generation of one-dimensional representations of complex porous media; and have explored estimating flow properties of a porous medium phenomenological relationships between capillary diameter, capillary pressure and permeability.

However, each of these teachings include, for example, one or more of the following characteristics: inaccurately describe the geometrical and spatial variation of confining diameter; fail to produce a one-dimensional capillary representation of the rock; do not describe the use of capillary flow models or any pore-scale flow model; cannot predict flow properties from first-principles representation; employ 2D images (from profilometry) to generate 3D samples using MPS, instead of starting directly from 3D images; failure to address computation of centerline representation of 3D geometries; failure to address centerline extraction from non-tubular source geometries; do not consider the planarization of a capillary geometry suitable for manufacturing representative flow chips; do not prescribe a dynamic, physics-based simulation; do not employ a continuous spatially-dependent description of the diameter variation along the pore channels; and do not allow the usage of different physical models including, for instance, nanoscale physical effects.

The exemplary embodiments encompass the use of a system (including sensors, hardware and software) that utilizes capillary network modeling of fluid flow to determine flow properties for recovery enhancers such as chemicals, polymers, nanoparticles, emulsions, gas bubbles, etc., when such recovery enhancers are added to the system.

A number of advantages can be gained by using capillary network modeling to help better describe fluid flow in a porous media. One such advantage is providing a computationally efficient process for simulations due to the simplified spatial representation of the porous rock, without sacrificing the nanoscopic physical detail required for obtaining accurate results. This simplified process enables faster turnaround time for simulations to support decision-making in large oil and gas operations.

The embodiments of the simulator in accordance with this invention beneficially enable a user to screen a set of potential additives for use in the field to enhance oil recovery, without requiring expensive and time consuming field trials to be conducted.

Reference can now be made to FIG. 1 for showing a non-limiting example of a simulator 10 and a simulation process/method workflow in accordance with embodiments of this invention. The rock sample, R, represents a physical input to the simulator. The blocks $S_1$, $S_n$, $S_N$ are representative of various data sources that are employed to perform characterization on R. An exemplary instance of sensor characterization is a three-dimensional physical representation of a porous medium, such as the one obtained by segmenting a Computed Tomography (CT) of a reservoir rock with micro-/nanometer resolution. These blocks, in addition to the blocks labeled 1A and 1B, may be characterized as being data generation and/or data integration functions. The blocks labeled 1L and 1M may be characterized as being visualization functions that can use a graphical user interface (GUI) to display results to a user. The remaining blocks 1C-1G and 1H-1K may be characterized as being computation/algorithmic functions.

In general, the various blocks of the simulator 10 that are shown in FIG. 1 can be implemented in whole or in part as discrete logic functions/engines, or they can be implemented in whole or in part by program code modules/subroutines/algorithms (computer program code), or they can be implemented as a combination of discrete logic functions/engines and computer program code.

The simulation workflow begins by populating an EOR database 1B from block 1A with physical characterizations of fluids and solids (rocks and dispersed particles). Block 1A receives the outputs of the $S_1$, $S_n$, $S_N$ and supplies these as the physical characterizations of fluids and solids to the EOR database 1B. These physical characterizations can include but are not limited to material data and flow properties data. This data may originate from the array of sources $\{S_n\}$ such as sensors, experimental tools, ab initio simulations, phenomenology and/or libraries. Rock characterization input data to the EOR database 1B provides at least geometrical information on a pore network of interest while the solid characterization input data to the EOR database 1B provides physical information regarding, for example, the wetting, chemistry, material, mechanical, spectroscopical, etc., properties of the solids involved in the simulation (rocks or suspended particles). Fluid characterization input data to the EOR database 1B can be represented as a list of fluid properties such as, but not limited to, density, viscosity, surface tension, line tension, molecular composition, structural factors and/or compressibility. The EOR database 1B is then loaded into the simulator 10 by data loading block 1C and consumed by the simulator 10 in order to begin processing the stored information.

The rock characterization input of block 1A may arise from various experimental and/or simulated sources. A three dimensional (3D) tomographic image, either obtained experimentally or generated numerically from a set of two dimensional (2D) images, can be read by the simulator 10. The 3D tomographic image is comprised of a collection of voxels (volume pixels), each representing a region of the sample of interest at a certain length scale. The voxel size (resolution) determines the scale at which the physics of the fluid-solid interaction should be captured by the simulator 10.

Experimental techniques such as, but not limited to, X-ray computed micro-tomography/nano-tomography, synchrotron computed micro-tomography/nano-tomography, dual-energy computed micro-tomography/nano-tomography, focused ion beam tomography, electron tomography, 3D atom probe, etc., may be used to measure the rock structure and to store the structural geometry in a data file. In computerized tomography, the voxels typically hold a gray-scale integer value (from 0 to 255 in 8-bit notation or 0 to 65535 in 16-bit notation) that is representative of the density and atomic number of the sample at that point. Denser regions are associated with the rock itself while lighter regions are associated with the pore space within the rock.

Certain numerical techniques, such as the MPS or the MSPS, can also be used to create 3D pseudo-cores suitable for use in the simulator 10 from a set of 2D images. Techniques for accomplishing this are described in, for example, Zhang et al., U.S. Pat. No. 8,725,477 B2, Hurley et al., U.S. Pat. No. 8,908,925 B2 and Hurley et al., US 20120221306 A1, as well as in Daian et al., Journal of Petroleum Science and Engineering 42 (2004) 15-28, Fernandes et al., Physical Review E 54, 1734 (1996) and Liang et al., Journal of Petroleum Science and Engineering 21, Issues 3-4, November 1998, Pages 273-283. Such 2D images can be obtained from experimental techniques such as scanning electron microscopy, scanning probe microscopy, atomic force microscopy and laser scanning fluorescence microscopy. Alternatively, any ad hoc 3D porous geometry, such as a close packing of spheres, can also be used as input. In addition, rock input data can be loaded from a library that may be proprietary or open, such as ROCK-ETH Group, http://www.rockphysics.ethz.ch/, Imperial College Department of Earth Science and Engineering, and/or Digital Rock Portal @ University of Texas.

The solid characterization input of block 1A conveys additional physical information such as chemistry, material, mechanics, spectroscopy, etc., other than the purely geometrical information that can be assigned to the solid voxels in order to augment the physical meaning attributed to them.

The operation of the simulator 10 can be enhanced by assigning additional information to the voxels such as, but not limited to, chemical composition, molecular termination, free energy, surface charge and philicity or phobicity towards a certain fluid. The solid characterization can be assumed to include as well the characterization of any solid particles that are to be dispersed in the embedding fluids.

The additional physical information of the solid characterization input is preferably representative of the solid properties at the same scale (voxel) as the geometric detail of the rock characterization input of block 1A is provided. Alternatively, if only information from a different scale is present, the required voxel-scale analog can be complemented by interpolation, extrapolation or by additional assumptions and calculations. The possible sources of the additional physical information are many and typically are ultimately defined by the length scale corresponding to the voxel size.

For nanometer-sized voxels it is possible to use either experimental nanoscience techniques (such as scanning probe or electron microscopy, hyperspectral imaging, confocal laser scanning microscopy, etc.) or atomic-scale or molecular-scale computer simulations (such as atomistic molecular dynamics, coarse-grained molecular dynamics, Monte Carlo, etc.) For micrometer-sized voxels it is possible to use experimental mesoscale techniques (such as profilometry, petrography, optical microscopy, mercury porosimetry, etc.) or mesoscale numerical techniques (such as the LBM, dissipative particle dynamics, smoothed particle dynamics, etc.) as is deemed most appropriate.

Alternatively, and for any length scale of interest, it is possible to resort to libraries and published results in the literature to populate the EOR database 1B with the physical properties required as inputs to the simulator 10. In addition, in a case where such additional information is not available an ad hoc value for the required physical property can be assigned to the voxels by the user.

After loading the EOR database 1B the process flow continues to execute block 1D where the geometrical properties of the rock can be determined by the application. The rock sample geometry determination of block 1D may involve image processing algorithms such as, but not limited to, noise-removal filters, image segmentation, image labeling and pixel statistics as well as 3D visualization of the geometry. The geometry determination of block 1D may also employ data from the solid characterization input of block 1A by correlating, for example, spectroscopy data (material) and tomography data (grayscale level) in order to enhance image segmentation algorithms. One goal of the geometry determination of block 1D is to segment the sample image into first voxels corresponding to "rock" and second voxels corresponding to "pores". A binary segmentation process can be employed in this regard.

Figure 2:
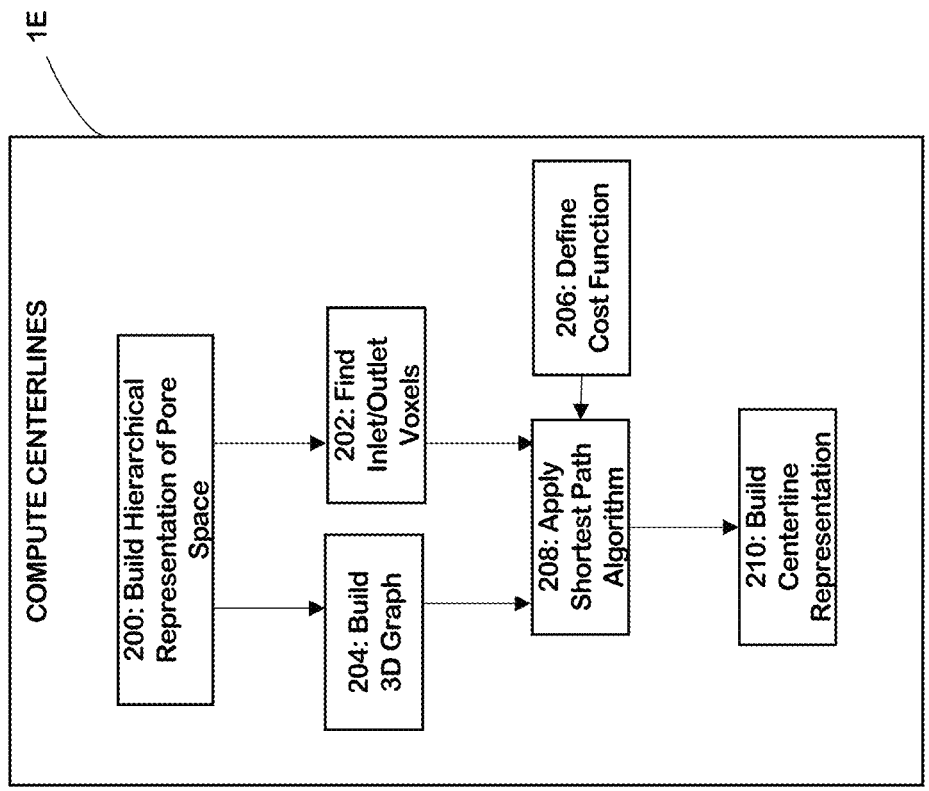
FIG. 2 is a flow chart for computing centerlines in accordance with example embodiments.

At block 1E, the computation of centerlines is performed. Referring also to FIG. 2, this figure is an example flow chart for performing the computation of centerlines. At block 200, a hierarchical representation of the pore space is built. Non-limiting suitable representations include any geometrical entity that corresponds to a subset of pore space voxels annotated with a certain measure of their distance to the boundary, such as:

- Distance Map (see, e.g., Kimmel, Ron, Nahum Kiryati, and Alfred M. Bruckstein. "Sub-pixel distance maps and weighted distance transforms." Journal of Mathematical Imaging and Vision 6.2-3 (1996): 223-233),
- Line/Straight Skeleton (see, e.g., Aichholzer, Oswin, and Franz Aurenhammer. "Straight skeletons for general polygonal figures in the plane." International Computing and Combinatorics Conference. Springer Berlin Heidelberg, 1996);
- Multi-Scale Skeleton (see, e.g., Falcão, Alexandre X., Luciano da Fontoura Costa, and B. S. Da Cunha. "Multiscale skeletons by image foresting transform and its application to neuromorphometry." Pattern recognition 35.7 (2002): 1571-1582); and
- Medial Axis see (see, e.g., Amenta, Nina, Sunghee Choi, and Ravi Krishna Kolluri. "The power crust, unions of balls, and the medial axis transform." Computational Geometry 19.2 (2001): 127-153).

Any combination of the above representations could also be used. The hierarchical representation need not be linear, and it may have planar patches. Suitable algorithms for obtaining such representations include:

- Thinning (see, e.g., Cheriet, Mohamed, et al. Character recognition systems: a guide for students and practitioners. John Wiley & Sons, 2007);
- Voronoi Diagrams (see, e.g., Aurenhammer, Franz. "Voronoi diagrams—a survey of a fundamental geometric data structure." ACM Computing Surveys (CSUR) 23.3 (1991): 345-405);
- Image Foresting Transform (see, e.g., Falcao, Alexandre X., Jorge Stolfi, and Roberto de Alencar Lotufo. "The image foresting transform: Theory, algorithms, and applications." IEEE Transactions on Pattern Analysis and Machine Intelligence 26.1 (2004): 19-29);
- Medial Axis Transformation (see, e.g., Sherbrooke, Evan C., Nicholas M. Patrikalakis, and Erik Brisson. "An algorithm for the medial axis transform of 3D polyhedral solids." IEEE transactions on visualization and computer graphics 2.1 (1996): 44-61);
- Euclidean Distance Transform (see, e.g., Breu, Heinz, et al. "Linear time Euclidean distance transform algorithms." IEEE Transactions on Pattern Analysis and Machine Intelligence 17.5 (1995): 529-533); and/or
- a combination of the above.

At block 202, voxels are selected, from the hierarchical representation built at block 200, at the edges of the original image (external faces of the μCT cube) corresponding to the entrance/exit of individual pores. According to an embodiment, the voxel selected is the most central voxel at the entrance/exit of an individual pore, a task for which the centrality-related voxel annotations might be useful. The larger the distance to the boundary, the larger the centrality of a voxel.

At block 204, a graph is built starting from the hierarchical representation where the voxels are vertices and neighborhood relationships are edges.

At 206, a cost function is defined. In particular, a cost is attributed for moving along an edge from one voxel to another, i.e., the weight of an edge. The cost associated to moving along an edge towards a specific voxel is inversely proportional to its centrality. Suitable choices for a cost function include, the inverse distance (when using Distance Map), the inverse skeleton level (when using Multi-Scale Skeleton) and/or simply the linear distance between voxels (when using Medial Axis or Line Skeleton).

At 208, the "shortest path" is determined (that with the lower cost) from all inlet voxels to all outlet voxels in the graph from block 204 using the cost function from block 206. Any suitable shortest path algorithm may be used, including but not limited to:

Single-Source Shortest Path algorithms (see, e.g., E. W. Dijkstra. A Note on Two Problems in Connexion with Graphs. In Numerische Mathematik 1, 1959; Bellman, Richard. "On a routing problem." Quarterly of applied mathematics (1958): 87-90; Garbow, Harold N. "Scaling algorithms for network problems." Journal of Computer and System Sciences 31.2 (1985): 148-168; and Thorup, Mikkel. "Integer priority queues with decrease key in constant time and the single source shortest paths problem." Proceedings of the thirty-fifth annual ACM symposium on Theory of computing. ACM, 2003); and All-Pairs Shortest Path algorithms (see, e.g., Floyd, Robert W. "Algorithm 97: shortest path." Communications of the ACM5.6 (1962): 345; Johnson, Donald B. "Efficient algorithms for shortest paths in sparse networks." Journal of the ACM (JACM) 24.1 (1977): 1-13; Williams, Ryan. "Faster all-pairs shortest paths via circuit complexity." Proceedings of the 46th Annual ACM Symposium on Theory of Computing. ACM, 2014; Pettie, Seth. "A new approach to all-pairs shortest paths on real-weighted graphs." Theoretical Computer Science 312.1 (2004): 47-74; and Hagerup, Torben. "Improved shortest paths on the word RAM." International Colloquium on Automata, Languages, and Programming. Springer Berlin Heidelberg, 2000.)

The result if block 208 is a set of one-voxel-wide paths from every inlet voxel to every outlet voxel.

At 210, all the shortest paths from block 208 are combined with the distance of each voxel to the nearest boundary from the hierarchical representation from block 200. Eventual overlaps between centerlines are removed. The result is a tubular representation of the pore space that takes into account the spatial variation of the diameter, tortuosity, geometry and connectivity.

Referring again to FIG. 1, block 1F of the simulator 10 determines the mechanical properties of the rock. The mechanical determination of block 1F can include the calculation of the mechanical and seismic properties of the rock such as, but not limited to, shear and bulk moduli, formation factor, elasticity, compressional velocity, shear velocity and electrical resistivity, which can also benefit seismic modeling simulators. Significantly, the mechanical determination process of block 1F may also apply reservoir-like conditions of pressure and temperature to deform the rock structure towards its reality in the oil field. As a result, the input to the flow simulation can be even more representative of the actual, real rock sample.

Figures 3, 4:
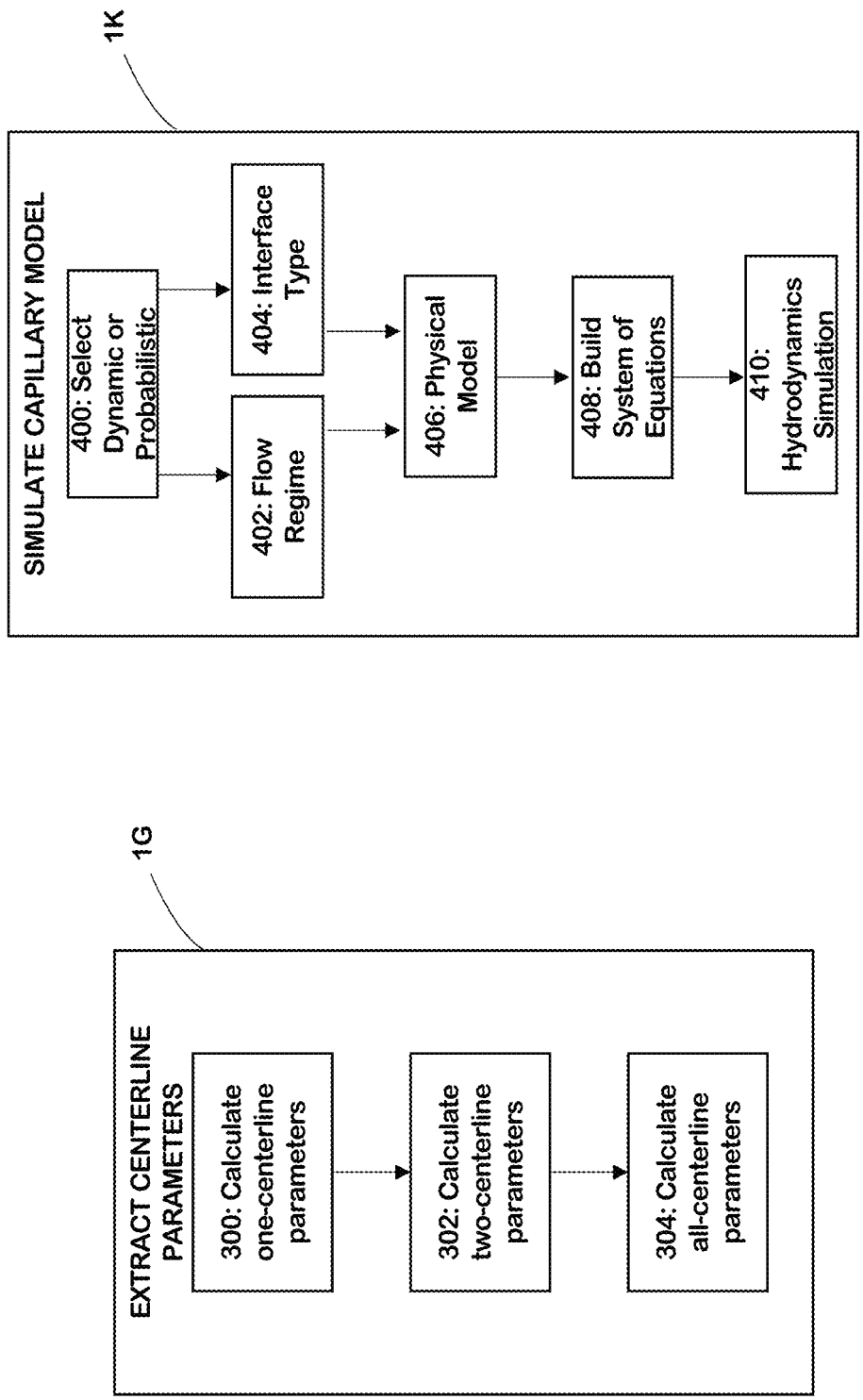
FIG. 3 is a flow chart for extracting centerline parameters in accordance with example embodiments.
FIG. 4 is a flow chart for simulating a capillary model in accordance with example embodiments.

At block 1G centerline parameters are extracted using the computed centerlines from block 1E. Referring also to FIG. 3, this figure shows a flow chart for computing the centerlines of block 1G. At block 300, a list of centerline properties defined for each individual centerline is calculated. In particular, the single-centerline properties include one or more of the following:

Centerline diameter, i.e., the diameter associated with each centerline. The centerline diameter is useful for calculating flow rates and capillary pressures.

Centerline length, i.e., the length associated to each centerline. The centerline length is useful for calculating pressure differences and hydrostatic effects.

Centerline endpoints, i.e., the positions of starting and end points of each centerline.

The centerline endpoints are useful for calculating connectivity and direction.

Centerline direction, i.e., the vector connecting endpoints of each centerline. The centerline direction is useful for calculating tortuosity, connectivity and gravitational effects.

Centerline azimuthal angle, i.e., the angle between centerline direction and vertical direction. The centerline azimuth angle is useful for calculating gravitational effects.

Tortuosity, i.e., the measure of how much each centerline differs from a straight line. The tortuosity is useful for upscaling.

Curvature, i.e., the measure of each centerline curvature radius. The curvature is useful for calculating inertial effects.

Torsion, i.e., the measure of how sharply each a centerline is twisted out of its plane of curvature. The torsion is useful for calculating inertial effects.

At block 302, a list of centerline properties is calculated and generated that are defined for a pair of connected centerlines. The list of centerline properties for the pair of connected centerlines include one or more of the following:

Angle between centerlines, i.e., angle between two connected centerlines. The angle between the centerlines is useful for calculating tortuosity.

Diameter variation, i.e., a difference in diameter between two connected centerlines. The diameter variation is useful for calculating inertial and capillary effects.

At block 304, correlation plots for pairs of centerline properties are calculated and statistics are calculated and correlation plots are generated for pairs of properties that are defined for all of the centerlines. Block 304 may output one or more of the following:

Node count: A number of nodes at which centerlines connect to each other. The node count is useful for estimating computational complexity.

Fan in/Fan out: number of centerlines connected to the inlet/outlets of a given centerline. Useful for estimating overall connectivity.

Connection matrix: binary matrix depicting the connection between centerlines. Useful for building the physical model.

Statistics: histogram, mean, min, max of each parameter in the one-centerline and two-centerline lists. Useful for upscaling.

Correlations: 2D-plots relating every one-centerline and two-centerline property to every other property of the same type, such as plotting the diameter of a centerline versus its length for all centerlines, or a first two-centerline property (e.g. angle) versus a second two-centerline property (e.g. diameter variation), for every pair of centerlines. These correlations are useful for upscaling.

Referring again to FIG. 1, at block 1H the various outputs of block 1D-1G may be validated against known experimental results by the experimental validation block 1H. The experimental validation process of block 1H can include, as non-limiting examples, a comparison of porosity, density, bulk and shear moduli and sound wave speeds to known experimental results.

For example, if the computed porosity of the digital rock sample does not match an experimentally determined porosity that was obtained by mercury porosimetry experiments one may be required to redo the micro-tomography using better spatial resolution and/or signal-to-noise ratios. Conversely, if the computed density does not match the experimental value one may need to recompile the list of constituent minerals and perform multi-level image segmentation to account for different mineral (solid) phases. As such, an iterative path (the No branch from block 1H) can be established and, at each iteration loop, the EOR database 1B can be augmented with additional, improved information that ultimately leads to an acceptable low-dimensional representation of the pore network of the rock at block 1G that terminates the iterative loop.

After the accuracy checks have been performed and the low-dimensional representation of the pore network has been experimentally validated at block 1H, control passes to block 1I where a list of target figures-of-merit is compiled, both for the solid (rock) and fluid physical properties. The values of such properties may, preferentially, be provided either by experiments or by ab initio atomic-scale/molecular-scale calculations, where the property values are preferably sensitive to nanoscale phenomena. An exemplary and non-exhaustive list of target nanoscale-aware figures-of-merit may include one or more of: (a) contact angles or appropriate measures of the rock's wettability with respect to one or more fluids; (b) fluid properties such as, but not limited to, density, viscosity, surface tension, line tension and compressibility; and (c) permeability with respect to single-phase and two-phase flow of simple fluids such as water and/or oil.

Relatedly, a concept of "full-sample dimensions" pertains to a length scale at which the figures-of-merit are defined. The figures-of-merit can be defined at a length scale that corresponds to the entire digital rock sample (for example, a computed micro-tomography scan), hence "full-sample dimensions". Note, however, that certain properties such as, for example, permeability cannot be defined at sub-micron scales. The figures-of-merit, although defined for "full-sample dimensions", can be highly sensitive to nanoscale phenomena, and it is in this sense that the model can be calibrated. In this case then it is desirable to tune the nanoscale interactions and observe their effect upon larger length scale properties such as, for example, the permeability of the entire porous rock sample.

After the list of figures-of-merit is compiled at block 1I the operation of the simulator 10 progresses to blocks 1J, 1K and 1L. It can be noted that recursions are possible between certain of these blocks, in particular between the flow model calibration block 1J and the figures-of-merit compilation block 1I, and between the flow properties determination block 1L and the flow model calibration block 1J (the line labeled "change additive").

Basically the portion of the simulator 10 represented by the blocks 1J, 1K and 1L involves the use of computational fluid dynamics algorithms such as, but not limited to, physics-based flow models including, for example, the Capillary Network Model. The geometrical and centerline data derived in blocks 1D, 1E (and 1F) may also be used as input to the fluid dynamics simulations.

In accordance with the selected flow model, the flow model calibration block 1J is operated to tune the (often unphysical) flow model parameters so that the nanoscale-aware figures-of-merit determined and enumerated at block 1I are matched as closely as possible. As was noted above, one exemplary figure-of-merit might be, for example, the water-oil contact angle on a given surface.

Note that certain additives such as, but not limited to, chemicals, polymers, nanoparticles, emulsions and gas bubbles can have an effect of changing the contact angle of an oil droplet on the rock surface thereby leading to a lower wettability and a higher oil recovery rate. Such a modification to the figure-of-merit (contact angle) is also preferably captured by the flow model calibration block 1J.

When all of the model parameters are calibrated with respect to their respective target figures-of-merit, the flow model is ready to provide predictive results. The iterative loop represented by the change additive arrow between the flow properties determination block 1L and the flow model calibration block 1J can be implemented simply by taking available candidate additives from a predefined list of additives, or by using an additive design methodology that tailors and optimizes the additive to maximize EOR efficiency.

Reoffering also to FIG. 4, this figure shows a flow chart for simulating the flow simulation of the capillary model at block 1K. In accordance with example embodiments.

At block 400, a desired simulation type is selected, e.g. via a user input. Options for the simulation type include dynamic and probabilistic simulation types. The probabilistic simulation type is based on a time-independent model where sweep efficiency and/or saturation distribution is calculated. As an example, a probabilistic simulation type may include quasi-static simulations [two-phase systems] in which time is ignored and capillaries fill one-at-a-time depending on pressure, in a probabilistic fashion. Generally a probabilistic simulation type will have a lower computational cost. Dynamic simulation types are based on a time-dependent model, where velocity and/or pressure fields may be calculated. For instance, dynamic simulation types may include one- or two-phase models where parameters such as interface positions, flow rates, and pressures are functions of time, with a higher computational cost for multiple phase systems.

As a non-limiting example, the following document provides a review of dynamic and probabilistic methods implemented in Pore Network Models: Blunt, Martin J., et al. "Detailed physics, predictive capabilities and macroscopic consequences for pore-network models of multiphase flow." Advances in Water Resources 25.8 (2002): 1069-1089. However, it is noted that Pore Network Models differ from capillary models as Pore Network Models do not consider the continuous spatial variation of the pore channel diameters.

At block 402, a flow regime is chosen to calculate the main forces in the capillary. The choice in flow regime may include, for example, stokes and quasi-static regime which neglects inertial and kinetic forces. Alternatively, the choice of flow regime may be a Laminar regime, where inertial and kinetic forces are considered. Depending on the choice of flow regime at block 402, forces, such as viscous, inertial, kinetic, hydrostatic forces, may be calculated.

At block 404, an interface type is chosen. The choice of interface type affects the accuracy and computational cost (e.g., see, H. T. Xue, Z. N. Fang, Y. Yang, J. P. Huang, L. W. Zhou. Contact angle determined by spontaneous dynamic capillary rises with hydrostatic effects: Experiment and theory. Chemical Physics Letters 432 (2006) 326-330). In single-phase flow simulations there is no interface to be accounted for. For multi-phase flows an interface type may be selected, such as a static interface, a simplified interface, or a dynamic interface. A static interface type is associated with a lower accuracy, but also requires a lower computational cost. A simplified interface is an equilibrated model and is adequate for Stokes regime. A dynamic interface provides high accuracy and also high computational cost. A dynamic interface is adequate for a laminar regime for example. The choice of interface type may also depend on availability of wetting data for specific systems. Wetting properties are typically parameterized by a three-phase contact angle, though parameterizations can vary depending on the physical model selected. For example, the wetting character of a fluid "A" with respect to a solid surface "S" in the presence of a second fluid "B" may be represented in terms of the three-phase (A-B-S) contact angle. Other metrics of wettability are also possible, such as the adsorption energy density and the contact-area-to-volume-ratio.

At block 406, a physical model is selected that will be used to represent capillary flow. In some examples, the simulator 10 may automatically (i.e. without user input) select a best model considering one or more of the following: simulation type; flow regime; interface type; wetting properties (e.g. relationship between dynamic parameters to deduce the wetting parameters: P-Q, V-contact angle, X-t); boundary conditions (inlet/outlet pressures and flow rates, external forces); fluid properties (e.g. rheology properties and surface tension), and initial conditions (e.g. initial fluid positions, initial fluxes) provided by the user. In other examples, the physical model may be selected manually by a user, e.g., via a user input. Some non-limiting examples of physical models include: Darcy, Poiseuille, Leonard-Washburn, Molecular Kinetic model (see, e.g., Whitaker, Stephen. "Flow in porous media I: A theoretical derivation of Darcy's law." Transport in porous media 1.1 (1986): 3-25; Washburn, Edward W. "The dynamics of capillary flow." Physical review 17.3 (1921): 273.atik 1.1 (1959): 269-271; and Blake, Terence D. "The physics of moving wetting lines." Journal of Colloid and Interface Science 299.1 (2006): 1-13).

Figure 5A:
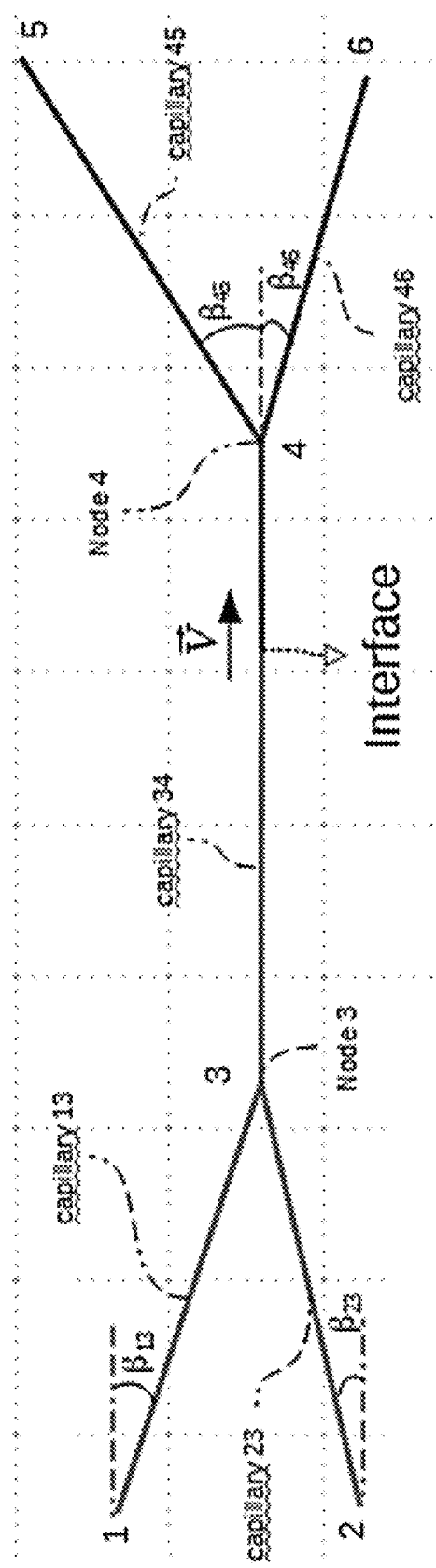
Figure 5B:
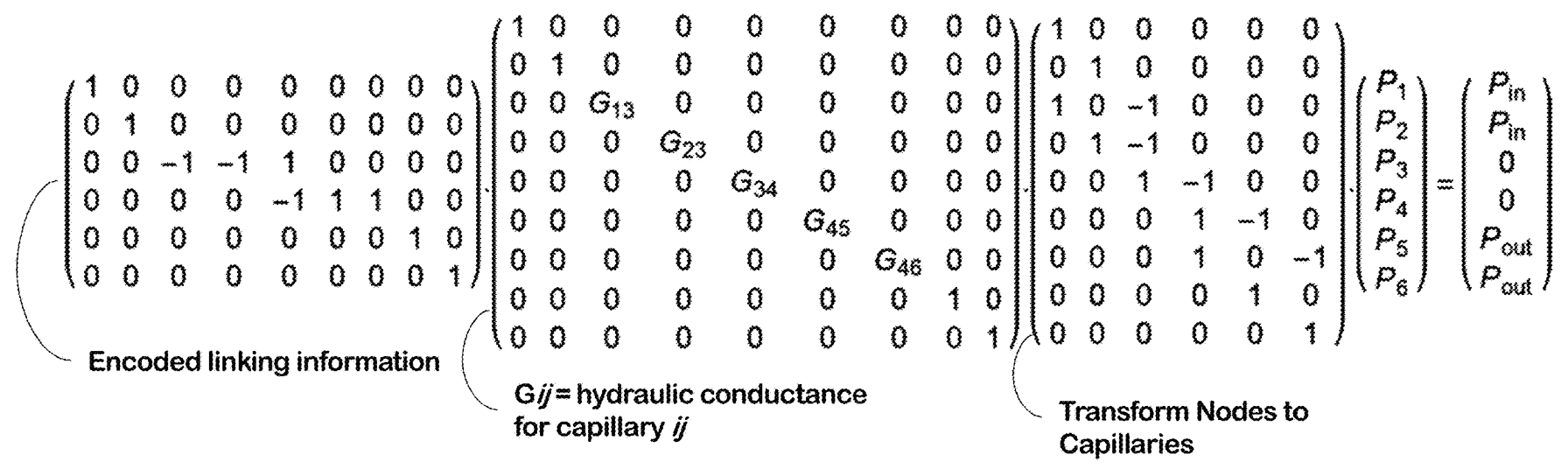

At block 408, a system of equations is built upon the centerline structure of the porous rock sample. The system will depend on pore centerline properties extracted in block 1G of FIG. 1, and also on the simulation type (dynamic or probabilistic), physical model, and conservation equations. The system of equations may solve for nodal pressures or fluid flow rates within the capillary network (see, e.g., Blunt, Martin J., et al. "Detailed physics, predictive capabilities and macroscopic consequences for pore-network models of multiphase flow." Advances in Water Resources 25.8 (2002): 1069-1089; and Nordhaug, Hans Fredrik, M. Celia, and Helge K. Dahle. "A pore network model for calculation of interfacial velocities." Advances in Water Resources 26.10 (2003): 1061-1074). A non-limiting example of a capillary network and the corresponding system of equations used to find nodal pressures is shown at FIGS. 5A and 5B. The capillary network shown in FIG. 5A is generated based on pore centerline data. In FIG. 5B, $P_{in}$ corresponds to pressures at the inlets of the capillary network in FIG. 5A, and $P_{out}$ corresponds to the pressures at the outlets of the capillary network in FIG. 5A.

At block 410, a hydrodynamics simulation includes resolving pressures and/or flow rates, iterating to find the pressures at nodes or flow through the capillaries, iterating through time or pressure changes as necessary (such as for two-phase, probabilistic or dynamic for example), and extracting the desired results. The nodal pressures may be determined using analytical (Gauss-Jordan elimination) or numerical methods (Runge-Kutta method) (see, e.g., Aker, Maloy and Hansen. A two-dimensional network simulator for two-phase flow in porous media. IKU Petroleum Research, N-7034 Trondheim, Norway; and Beamount, Bodiguel and Colin. Drainage in two-dimensional porous media with polymer solutions. Soft Matter, 2013, 9, 10174). The desired physical quantities may include permeability tensors, drainage curves, oil left in place, and flow rates for example.

Returning to FIG. 1, the final goal of this process is the determination of flow properties at block 1L. The flow properties can contain three-dimensional fields (scalar, vector or tensor) representing spatially-dependent physical data in the rock sample such as, but not limited to, flow velocity, pressure and density, as well as overall physical properties (scalar, vector or tensor) that quantitatively characterize the fluid flow and the oil recovery in the porous rock sample such as, but not limited to, absolute and relative permeability tensors, oil sweep efficiency and capillary pressure.

The arrow labeled "correlation" between the extract centerline parameters process of block 1G and the flow properties determination process of block 1L indicates an ability to verify that the determined flow properties are compatible with the previously determined geometrical, morphological and mechanical properties of the rock.

Figure 6:
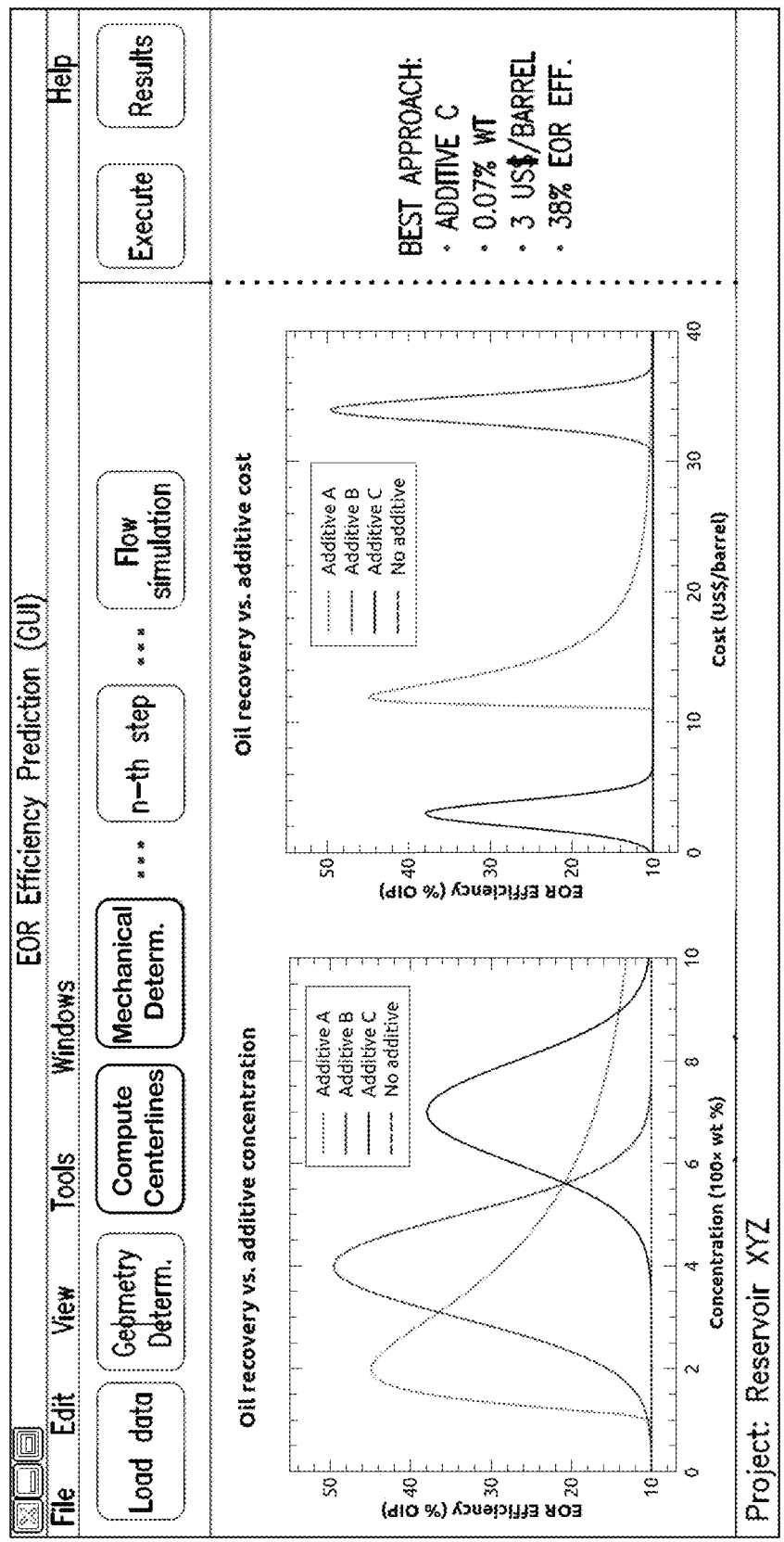
FIG. 6 is an example of a graphical user interface presentation to a user of the simulator shown in FIG. 1.

The EOR efficiency prediction block 1M can be implemented as a visualization process using a GUI, an example output of which is shown in FIG. 6 for three selected additives (A, B and C) and with no additive. This process of the simulator 10 enables a quantification to be made of the effect of an additive or additives on the flow properties. Once all candidate additives have been tested, their EOR efficiency with respect to, for example, a simple waterflooding (without additives) and to one another can be quantified and ranked, allowing for the selection of the best candidate EOR approach, while considering also, for example, cost-effectiveness criteria. The GUI can be useful to display the simulator 10 results for different candidate EOR additives to aid in determining an optimum EOR approach. In the illustrated example three additives (and no additive) are characterized for EOR efficiency vs. concentration and for EOR efficiency vs. cost and additive C is shown to provide the best approach.

The various buttons displayed on the GUI can be used to initiate the various simulator blocks/processes (e.g., load data 1C, geometry determination 1D, compute centerlines 1E, etc.) as described above with reference to FIG. 1.

An output from the EOR efficiency prediction block 1M, representing a result of the simulation workflow including EOR efficiencies for each tested additive and other information, can be fed back to the EOR database 1B. By augmenting the EOR database 1B with the information descriptive of EOR efficiency it becomes possible to build a knowledge base that can be later accessed by, as one non-limiting example, a cognitive processing system for providing insights into EOR strategies. The EOR database 1B can contain, for example, both structured and unstructured data related to the inputs and outputs of all system processes, as well as external information (with respect to the system) that can, however, be correlated to the system data. Non-limiting examples of such data can include bulk scalar (porosity), vector (average flow velocity vector) or tensor (permeability) variables, spatially-dependent scalar (density), vector (flow velocity) or tensor (stiffness) fields as well as images (graphs), texts (reports) and various tables of interest (e.g., cost of additives).

Figure 7:
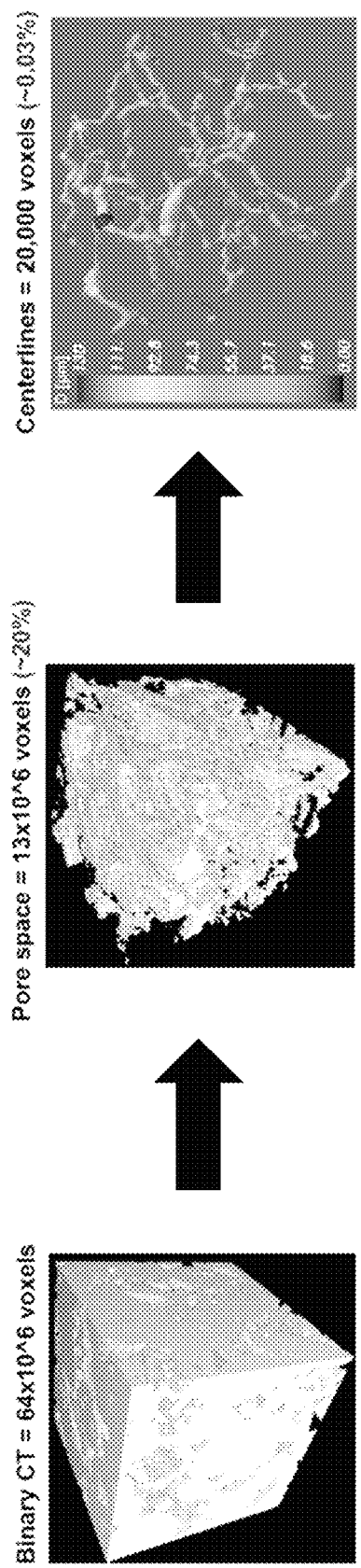
FIG. 7 shows a comparison for different representations of a porous rock sample.

An advantage of the techniques described above is providing a computationally efficient process for simulations due to the simplified spatial representation of the porous rock, without sacrificing the nanoscopic physical detail required for obtaining accurate results. FIG. 7 shows a comparison of different representation of a porous rock sample. The left image is a binary CT representation of the rock sample, the middle image is a pore space model representation of the rock sample, and the right image is a centerline representation of a rock sample. Image captions indicate the number, both absolute and as a percentage of the size of the binary CT representation, of voxels required for each representation. As shown in FIG. 7, the centerlines representation has significantly fewer voxels, and which allows for more efficient processing.

Figure 8:
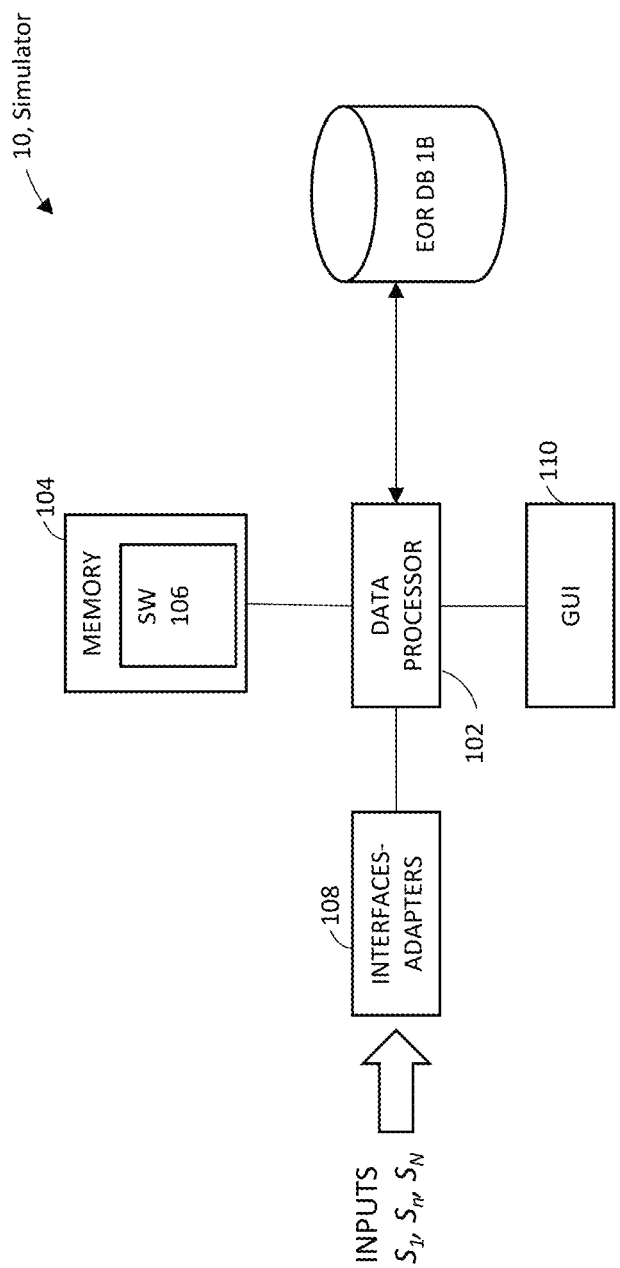
FIG. 8 is an example of a block diagram of the simulator shown in FIG. 1.

FIG. 8 is an example of a block diagram of the simulator 10 shown in FIG. 1. The simulator 10 includes at least one controller/data processor 102 connected with at least one memory 104 that stores software (SW) 106. The software 106 can include those programs that are desirable to run to perform the determinations of the geometrical properties, mechanical properties of the rock (blocks 1D, 1F) and the computation of the centerlines and extraction of the centerline parameter (blocks 1E and 1G), the experimental validation operation of block 1H, the compilation of the list of figures-of-merit of block 1I, the flow model calibration of block 1J, the flow simulation for the capillary mode of block 1K, the flow properties determination of block 1L and the EOR efficiency prediction performed by block 1M. Bi-directionally connected with the at least one controller/data processor 102 is the EOR database 1B. The data processor 102 is also connected with interfaces/adapters 108 that are configured to receive data from the various source inputs $S_1$, $S_n$, $S_N$. Also connected with the at least one controller/data processor 102 is at least one display device/GUI 110 that implements at least in part the various simulation visualization operations (e.g., blocks 1G, 1L) as well as the EOR efficiency prediction block 1M.

In general the various components and sub-systems shown in FIG. 8 can be implemented in whole or in part as circuitry and/or as separate special purpose data processor/controllers and/or as the software 106.

The simulator 10 can be physically instantiated in whole or in part as one or more computers and computing systems at an enterprise, such as at a natural resources exploration/recovery enterprise, or it could be, for example, instantiated at an agency or an academic institution, or it can be instantiated in whole or in part in a virtual manner in the cloud. In some embodiments the use of the simulator 10 can be provided as a service to researchers and others via data communication networks including the Internet.

In whatever physical/virtual form the simulator 10 is instantiated it can be assumed to include certain cooperating functionality that is responsive to the input source/sensor data (source inputs $S_1$, $S_n$, $S_N$), as well as to the other input and/or calculated data stored in the EOR database 1B, to execute whatever modeling/simulation programs that are selected by the user at least for the purpose of determining optimum additives and corresponding EOR efficiencies for some natural resource-containing reservoir(s). This cooperative functionality can include, in addition to the EOR database 1B, some or all of the various blocks 1A and 1C-1M which can be realized as physical components/circuitry and/or as executable program code modules and partitions.

The present invention may be a system, a method, and/or a computer program product. The computer program product may include a computer readable storage medium (or media) having computer readable program instructions thereon for causing a processor to carry out aspects of the present invention.

Figure 9:
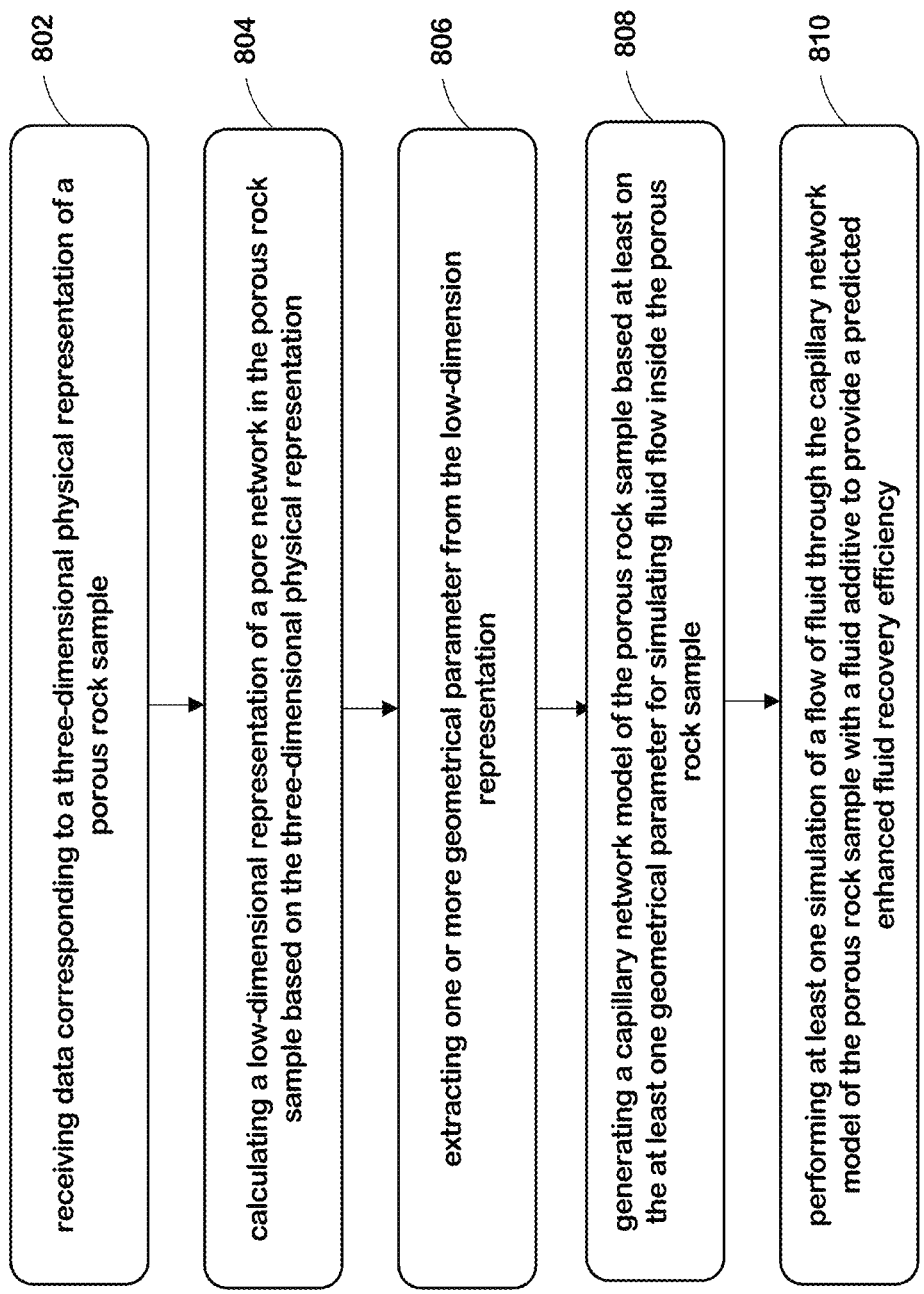
FIG. 9 is a logic flow diagram for capillary network simulations based on a low-dimensional representation of porous media, and illustrates the operation of an exemplary method, a result of execution of computer program instructions embodied on a computer readable memory, functions performed by logic implemented in hardware, and/or interconnected means for performing functions in accordance with exemplary embodiments.

FIG. 9 is a logic flow diagram for capillary network simulations based on a low-dimensional representation of porous media, and illustrates the operation of an exemplary method, a result of execution of computer program instructions embodied on a computer readable memory, functions performed by logic implemented in hardware, and/or interconnected means for performing functions in accordance with exemplary embodiments.

Referring to FIG. 9, a method may be provided including: receiving data corresponding to a three-dimensional physical representation of a porous rock sample as indicated by block 900; calculating a low-dimensional representation of a pore network in the porous rock sample based on the three-dimensional physical representation as indicated by block 902; extracting one or more geometrical parameter from the low-dimension representation as indicated by block 904; generating a capillary network model of the porous rock sample based at least on the at least one geometrical parameter for simulating fluid flow inside the porous rock sample as indicated by block 906; and performing at least one simulation of a flow of fluid through the capillary network model of the porous rock sample with a fluid additive to provide a predicted enhanced fluid recovery efficiency as indicated by block 908.

The low-dimensional representation of the pore network may be a centerline representation that comprises a set of centerlines representing the pore network. The centerline representation may be indicative of a spatial variation of a diameter, tortuosity, geometry and connectivity of the pore network. Extracting the at least one geometrical parameter may include generating a first list of values for each centerline in the set, the first list comprising values for at least one of the following centerline parameters: a centerline diameter, a centerline length, centerline endpoints; centerline direction; centerline azimuthal angle; centerline tortuosity; centerline curvature; and centerline torsion. Extracting the at least one geometrical parameter further may include generating a second list of values defined for each pair of connected centerlines in the set of centerlines, the second list comprising values for at least one of the following centerline parameters: an angle between each pair of connected centerlines: and a diameter variation between each pair of connected centerlines. Extracting the at least one geometrical parameter may include calculating for the set of centerlines at least one of: a total number of nodes at which centerlines in the set connect to each other; a total number of centerlines that are connected to an inlet and/or an outlet of a given centerline in the set; a binary matrix depicting connections between centerlines in the set; statistics corresponding to the generated first lists and the generated second lists; and two-dimensional plots relating every parameter in each of the first lists to every parameter in the second list. Performing at least one simulation of capillary model may include at least one of: determining a simulation type comprising at least one of a probabilistic simulation type that is time-independent, and a dynamic simulation type that is time-dependent; determining a flow regime where either inertial and kinetic forces are ignored in the at least one simulation or inertial and kinetic forces are considered in the at least one simulation; and determining an interface type from a plurality of interface types, wherein the plurality of interface types comprises at least one multi-phase interface type. The interface type may be selected based on one or more of: wetting properties of the porous rock sample; initial position of the fluid and initial fluxes, inlet and/or outlet pressures, flow rates, and external forces; and rheology properties and surface tension of the fluid. The interface type may be selected by a user via a user input.

According to another embodiment, an apparatus (e.g. simulator 10 of FIG. 8) may be provided, comprising at least one processor; and at least one memory including computer program code, the at least one memory and the computer program code configured to, with the at least one processor, cause the apparatus to at least: receive data corresponding to a three-dimensional physical representation of a porous rock sample; calculate a low-dimensional representation of a pore network in the porous rock sample based on the three-dimensional physical representation; extract one or more geometrical parameter from the low-dimension representation; generate a capillary network model of the porous rock sample based at least on the at least one geometrical parameter for simulating fluid flow inside the porous rock sample; and perform at least one simulation of a flow of fluid through the capillary network model of the porous rock sample with a fluid additive to provide a predicted enhanced fluid recovery efficiency.

The low-dimensional representation of the pore network may be a centerline representation that comprises a set of centerlines representing the pore network. The centerline representation may be indicative of a spatial variation of a diameter, tortuosity, geometry and connectivity of the pore network. Extraction of the at least one geometrical parameter may include generating a first list of values for each centerline in the set, the first list comprising values for at least one of the following centerline parameters: a centerline diameter, a centerline length, centerline endpoints; centerline direction; centerline azimuthal angle; centerline tortuosity; centerline curvature; and centerline torsion. The extraction of the at least one geometrical parameter may include generating a second list of values defined for each pair of connected centerlines in the set of centerlines, the second list comprising values for at least one of the following centerline parameters: an angle between each pair of connected centerlines: and a diameter variation between each pair of connected centerlines. The extraction of the at least one geometrical parameter may include calculating for the set of centerlines at least one of: a total number of nodes at which centerlines in the set connect to each other; a total number of centerlines that are connected to an inlet and/or an outlet of a given centerline in the set; a binary matrix depicting connections between centerlines in the set; statistics corresponding to the generated first lists and the generated second lists; and two-dimensional plots relating every parameter in each of the first lists to every parameter in the second list. Performance of the at least one simulation of capillary model may include at least one of: determination of a simulation type comprising at least one of a probabilistic simulation type that is time-independent, and a dynamic simulation type that is time-dependent; determination of a flow regime where either inertial and kinetic forces are ignored in the at least one simulation or inertial and kinetic forces are considered in the at least one simulation; and determination of an interface type from a plurality of interface types, wherein the plurality of interface types comprises at least one multi-phase interface type. The interface type may be selected based on one or more of: wetting properties of the porous rock sample; initial position of the fluid and initial fluxes, inlet and/or outlet pressures, flow rates, and external forces; and rheology properties and surface tension of the fluid. The interface type is selected by a user via a user input.

According to another embodiment, a computer program product for capillary network simulations, the computer program product comprising a computer readable storage medium (e.g. memory 104 of FIG. 8) having program instructions embodied therewith, the program instructions executable by a device to cause the device to: receive data corresponding to a three-dimensional physical representation of a porous rock sample; calculate a low-dimensional representation of a pore network in the porous rock sample based on the three-dimensional physical representation; extract one or more geometrical parameter from the low-dimension representation; generate a capillary network model of the porous rock sample based at least on the at least one geometrical parameter for simulating fluid flow inside the porous rock sample; perform at least one simulation of a flow of fluid through the capillary network model of the porous rock sample with a fluid additive to provide a predicted enhanced fluid recovery efficiency.

The low-dimensional representation of the pore network is a centerline representation that comprises a set of centerlines representing the pore network, and wherein the centerline representation is indicative of a spatial variation of a diameter, tortuosity, geometry and connectivity of the pore network.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    receiving data corresponding to a three-dimensional physical representation of a porous rock sample;
    calculating a low-dimensional representation of a pore network in the porous rock sample based on the three-dimensional physical representation, wherein calculating the low-dimensional representation of the pore network comprises determining a shortest path from all inlet voxels to all outlet voxels of the low-dimensional representation;
    extracting at least one geometrical parameter from the low-dimension representation;
    generating a capillary network model of the porous rock sample based at least on the at least one geometrical parameter for simulating fluid flow inside the porous rock sample; and
    performing at least one simulation of a flow of fluid through the capillary network model of the porous rock sample with a fluid additive to provide a predicted enhanced fluid recovery efficiency.

2. The method of claim 1, wherein the low-dimensional representation of the pore network is a centerline representation that comprises a set of centerlines representing the pore network.

3. The method of claim 2, wherein the centerline representation is indicative of a spatial variation of a diameter, tortuosity, geometry and connectivity of the pore network.

4. The method of claim 2, wherein extracting the at least one geometrical parameter comprises generating a first list of values for each centerline in the set, the first list comprising values for at least one of the following centerline parameters: a centerline diameter, a centerline length, centerline endpoints; centerline direction; centerline azimuthal angle; centerline tortuosity; centerline curvature; and centerline torsion.

5. The method of claim 4, wherein extracting the at least one geometrical parameter further comprises generating a second list of values defined for each pair of connected centerlines in the set of centerlines, the second list comprising values for at least one of the following centerline parameters: an angle between each pair of connected centerlines; and a diameter variation between each pair of connected centerlines.

6. The method of claim 5, wherein extracting the at least one geometrical parameter further comprises calculating for the set of centerlines at least one of:
   a total number of nodes at which centerlines in the set connect to each other;
   a total number of centerlines that are connected to an inlet and/or an outlet of a given centerline in the set;
   a binary matrix depicting connections between centerlines in the set;
   statistics corresponding to the generated first lists and the generated second lists; and
   two-dimensional plots relating every parameter in each of the first lists to every parameter in the second list.

7. The method of claim 1, wherein the performing at least one simulation of a flow of fluid through the capillary network model comprises at least one of:
   determining a simulation type comprising at least one of a probabilistic simulation type that is time-independent, and a dynamic simulation type that is time-dependent;
   determining a flow regime where either inertial and kinetic forces are ignored in the at least one simulation or inertial and kinetic forces are considered in the at least one simulation; and
   determining an interface type from a plurality of interface types, wherein the plurality of interface types comprises at least one multi-phase interface type.

8. The method of claim 7, wherein the interface type is selected based on one or more of:
   wetting properties of the porous rock sample;
   initial position of the fluid and initial fluxes,
   inlet and/or outlet pressures, flow rates, and external forces; and
   rheology properties and surface tension of the fluid.

9. The method of claim 7, wherein the interface type is selected by a user via a user input.

10. An apparatus, comprising at least one processor; and at least one memory including computer program code, the at least one memory and the computer program code configured to, with the at least one processor, cause the apparatus to at least:
    receive data corresponding to a three-dimensional physical representation of a porous rock sample;
    calculate a low-dimensional representation of a pore network in the porous rock sample based on the three-dimensional physical representation, wherein calculating the low-dimensional representation of the pore network comprises determining a shortest path from all inlet voxels to all outlet voxels of the low-dimensional representation;
    extract at least one geometrical parameter from the low-dimension representation;
    generate a capillary network model of the porous rock sample based at least on the at least one geometrical parameter for simulating fluid flow inside the porous rock sample; and
    perform at least one simulation of a flow of fluid through the capillary network model of the porous rock sample with a fluid additive to provide a predicted enhanced fluid recovery efficiency.

11. The apparatus of claim 10, wherein the low-dimensional representation of the pore network is a centerline representation that comprises a set of centerlines representing the pore network.

12. The apparatus of claim 11, wherein the centerline representation is indicative of a spatial variation of a diameter, tortuosity, geometry and connectivity of the pore network.

13. The apparatus of claim 11, wherein extraction of the at least one geometrical parameter comprises generating a first list of values for each centerline in the set, the first list comprising values for at least one of the following centerline parameters: a centerline diameter, a centerline length, centerline endpoints; centerline direction; centerline azimuthal angle; centerline tortuosity; centerline curvature; and centerline torsion.

14. The apparatus of claim 13, wherein extraction of the at least one geometrical parameter further comprises generating a second list of values defined for each pair of connected centerlines in the set of centerlines, the second list comprising values for at least one of the following centerline parameters: an angle between each pair of connected centerlines; and a diameter variation between each pair of connected centerlines.

15. The apparatus of claim 14, wherein extraction of the at least one geometrical parameter further comprises calculating for the set of centerlines at least one of:
    a total number of nodes at which centerlines in the set connect to each other;
    a total number of centerlines that are connected to an inlet and/or an outlet of a given centerline in the set;
    a binary matrix depicting connections between centerlines in the set;
    statistics corresponding to the generated first lists and the generated second lists; and
    two-dimensional plots relating every parameter in each of the first lists to every parameter in the second list.

16. The apparatus of claim 10, wherein the performance of at least one simulation of a flow of fluid through the capillary network model comprises at least one of:
    determination of a simulation type comprising at least one of a probabilistic simulation type that is time-independent, and a dynamic simulation type that is time-dependent;
    determination of a flow regime where either inertial and kinetic forces are ignored in the at least one simulation or inertial and kinetic forces are considered in the at least one simulation; and
    determination of an interface type from a plurality of interface types, wherein the plurality of interface types comprises at least one multi-phase interface type.

17. The apparatus of claim 16, wherein the interface type is selected based on one or more of:
    wetting properties of the porous rock sample;
    initial position of the fluid and initial fluxes,
    inlet and/or outlet pressures, flow rates, and external forces; and
    rheology properties and surface tension of the fluid.

18. The apparatus of claim 16, wherein the interface type is selected by a user via a user input.

19. A computer program product for capillary network simulations, the computer program product comprising a non-transitory computer readable storage medium having program instructions embodied therewith, the program instructions executable by a device to cause the device to:
    receiving data corresponding to a three-dimensional physical representation of a porous rock sample;
    calculating a low-dimensional representation of a pore network in the porous rock sample based on the three-dimensional physical representation, wherein calculating the low-dimensional representation of the pore network comprises determining a shortest path from all inlet voxels to all outlet voxels of the low-dimensional representation;

extracting at least one geometrical parameter from the low-dimension representation;

generating a capillary network model of the porous rock sample based at least on the at least one geometrical parameter for simulating fluid flow inside the porous rock sample; and performing at least one simulation of a flow of fluid through the capillary network model of the porous rock sample with a fluid additive to provide a predicted enhanced fluid recovery efficiency.

20. The computer program product of claim 19, wherein the low-dimensional representation of the pore network is a centerline representation that comprises a set of centerlines representing the pore network, and wherein the centerline representation is indicative of a spatial variation of a diameter, tortuosity, geometry and connectivity of the pore network.

* * * * *